United States Patent
Rodriguez et al.

(10) Patent No.: US 10,798,930 B1
(45) Date of Patent: Oct. 13, 2020

(54) FISHING ROD HOLDER

(71) Applicants: Gustavo Rodriguez, Rainsville, NM (US); Angelica Rodriguez, Rainsville, NM (US)

(72) Inventors: Gustavo Rodriguez, Rainsville, NM (US); Angelica Rodriguez, Rainsville, NM (US)

( * ) Notice: Subject to any disclaimer, the term of this patent is extended or adjusted under 35 U.S.C. 154(b) by 0 days.

(21) Appl. No.: 16/421,968

(22) Filed: May 24, 2019

(51) Int. Cl.
*A01K 97/10* (2006.01)
*B60R 9/06* (2006.01)
*B60R 9/08* (2006.01)

(52) U.S. Cl.
CPC ........... *A01K 97/10* (2013.01); *B60R 9/06* (2013.01); *B60R 9/08* (2013.01)

(58) Field of Classification Search
CPC .............. A01K 97/10; B60R 9/06; B60R 9/08
See application file for complete search history.

(56) References Cited

U.S. PATENT DOCUMENTS

| | | | |
|---|---|---|---|
| 5,813,164 A * | 9/1998 | Liberto | A01K 97/10 43/21.2 |
| 7,472,510 B1 | 1/2009 | Fasola | |
| 8,393,111 B1 * | 3/2013 | Johnson | A01K 97/08 211/70.8 |
| 9,986,827 B1 * | 6/2018 | Long | A47B 81/005 |
| 2011/0179692 A1 | 7/2011 | McKnight et al. | |
| 2017/0036614 A1 * | 2/2017 | Rahman | A01K 97/08 |
| 2018/0110210 A1 * | 4/2018 | Placko | B60R 9/08 |

* cited by examiner

*Primary Examiner* — Corey N Skurdal
(74) *Attorney, Agent, or Firm* — Sanchelima & Associates, P.A.; Christian Sanchelima; Jesus Sanchelima

(57) ABSTRACT

A fishing rod holder for holding a plurality of fishing rods during transportation is disclosed. The fishing rod holder comprises a plate, a plurality of brackets mounted to the plate and a plurality of tubes mounted at an angle facing upward to the plate. Each of the plurality of tubes comprises a fishing rod receiving section. The plurality of brackets is mounted to a pickup bed of a vehicle. Each of the plurality of fishing rods is received in the fishing rod receiving section to hold the plurality of fishing rods firmly during transportation. A fishing rod holder provided on a rooftop of a vehicle is also disclosed. In this embodiment the fishing rod holder comprises a base plate, connectors at an angle on the base plate, a plurality of tubes mounted to the connectors and a fishing rod receiving section to hold a plurality of fishing rods. This embodiment serving the same purpose as the aforementioned embodiment but now mountable on different types of vehicles.

11 Claims, 5 Drawing Sheets

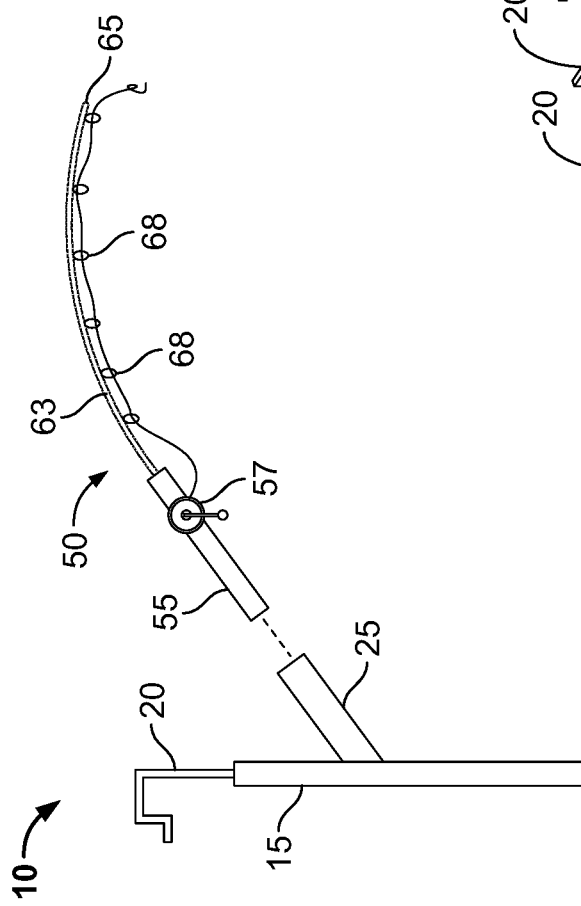
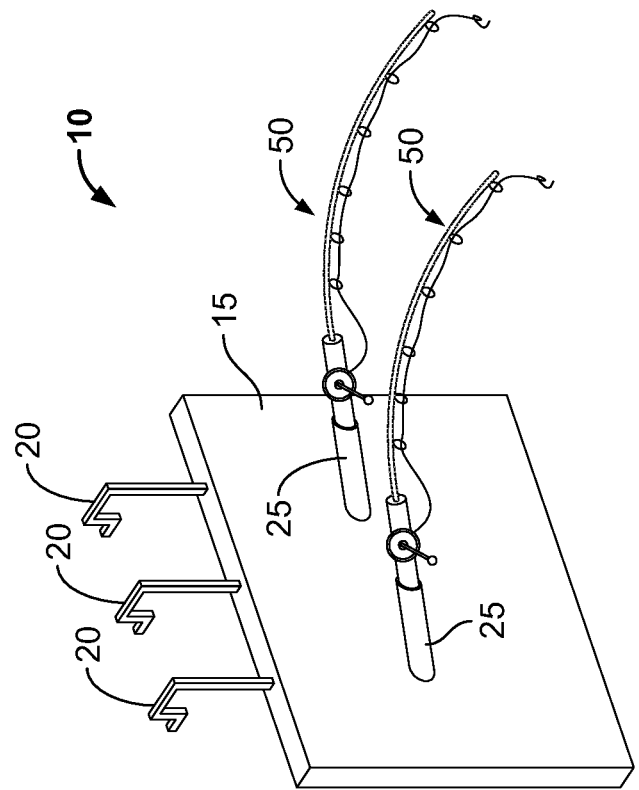

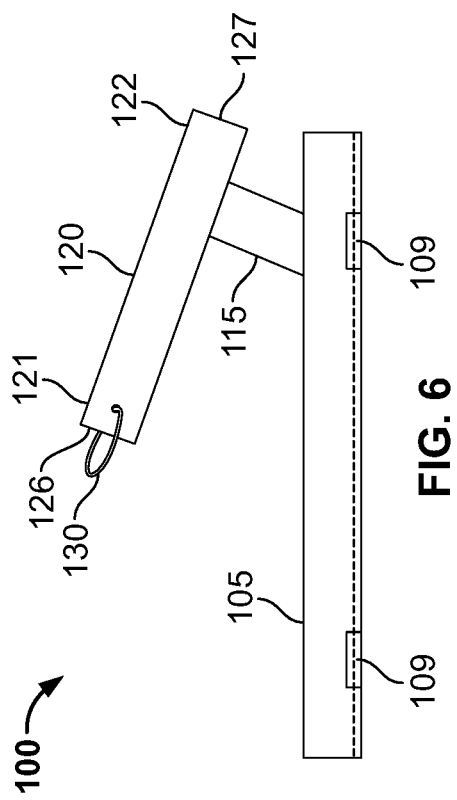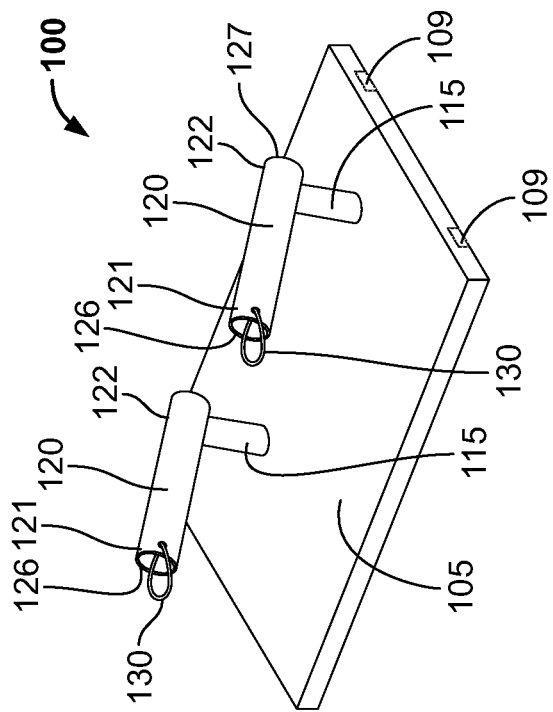

FISHING ROD HOLDER

BACKGROUND OF THE INVENTION

1. Field of the Invention

The present disclosure generally relates to a field of holders for fishing rods. More specifically, the present disclosure relates to a fishing rod holder installed on a vehicle for holding fishing rods during transportation.

2. Description of the Related Art

It is known that fishermen own a number of fishing rods. As known, the fishing rods are used for ice fishing or fishing on open water. As such, fishermen commonly transport multiple fishing rods at a time. As known, the fishing rods include reels.

When transporting the fishing rods and reels, for example, from a residence to a marina site or other location, the fishing rods and reels may get scratched or damaged, if the fishing rods and reels are merely stacked or bundled together and placed in a vehicle, such as the bed of a truck. For instance, when the fishing rods and reels are merely stacked or bundled together and placed in the vehicle, during transportation, the fishing rods and reels can get damaged from sliding and impacting (or being impacted by) other objects including vehicular structures and other loose items. Additionally, there is a risk of the fishing rods and reels getting stolen if they are not firmly held onto some object in the vehicle. Therefore, there is a need for mounting the fishing rods and reels to the vehicle to ensure that the fishing rods and reels do not get damaged, scratched or stolen.

In order to overcome the above problems, several solutions have been provided in the past. One such solution includes providing a fishing rod holder, which is mounted to the vehicle. The fishing rod holder receives the fishing rods and reels and ensures that the fishing rods and reels do not get damaged or starched during transportation. Further, the fishing rod holder provides a means to securely mount the fishing rods and reels so as to prevent them from getting stolen.

One such example of the fishing rod holder system is disclosed in United States patent application 20110179692. In US20110179692A1, it is disclosed that a fishing rod transporter includes a hollow tubular holder coupled to an adjustable length bar. The hollow holder defines a compartment for receiving a handle-end of a fishing rod. Slots formed in the peripheral wall of the top end of the hollow holder define a limited space for receiving a neck of a fishing reel, and the adjustable length bar is extendible to securely fit between sidewalls of a bed of a pickup truck. The adjustable length bar is extendible (by threaded engagement or ratcheting action) to securely fit between sidewalls of a bed of a pickup truck. An adjustable clamp is attached to the hollow holder and configured to secure the holder to the adjustable length bar. Optionally, a lock assembly engages the top of the hollow holder and prevents removal of the rod and reel by blocking release of the reel neck from the first slot.

Another example is disclosed in United States patent application 20180110210. In US20180110210A1, it is disclosed that a fishing rod holder device holds and transports multiple rod sections on a truck bed. The rod holder device comprises a frame and rod receptors. The frame is removably attached to a front bed rail of a load bed of the truck. The frame fixedly attaches a set of rod receptors at a predefined inclination along the length of the frame, where each rod receptor is configured to house the rod section. The intermediate bar is fixedly attached across outer surface of each rod receptor, where another set of rod receptors is fixedly attached along the length of the intermediate bar at the predefined inclination. The predefined inclination of the rod receptors with the front bed rail defines a triangular orientation, where the triangular orientation is configured to increase the load bearing capacity of the frame.

Yet another is disclosed in a United States granted U.S. Pat. No. 7,472,510. In U.S. Pat. No. 7,472,510B1, it is disclosed that a fishing rod holder for mounting within a pickup truck bed includes a housing having a top surface with a pair of sidewalls depending therefrom. Also depending from the top surface are a vertical front wall and an oblique, inwardly extending rear wall. Received within the housing and accessible from the top surface thereof are a plurality of obliquely extending tubular rod holders. A mounting lip is positioned adjacent a front edge of the top surface for fastening the housing to a truck bed wall or toolbox.

Although the disclosures discussed above are capable of holding the fishing rods firmly and help in minimizing bending or breakage of the fishing rods when the vehicle is moving, they have few problems. For instance, the fishing rod holders discussed above are difficult to mount to the vehicle. As a result, it takes considerable time and effort of a user to mount and unmount the fishing rod holder to the vehicle. Further, the fishing rod holders are limited in their use in that the fishing rod holder can be installed only at the rear i.e., pickup bed of the vehicle. Therefore, they take up much of the space in the pickup bed and restrict use of the space for storing other equipment or fish captured by the fishermen.

Other documents describing the closest subject matter provide for a number of more or less complicated features that fail to solve the problem in an efficient and economical way. None of these patents suggest the novel features of the present invention. Specifically, none of the disclosures in the art disclose a fishing rod holder that is easy to mount to a vehicle and capable of holding a fishing rod during transport.

Therefore, there is a need in the art to provide a fishing rod holder that is easy to mount to a vehicle and capable of holding a fishing rod during transport.

SUMMARY OF THE INVENTION

It is one of the main objects of the present invention to provide a fishing rod holder for holding a plurality of fishing rods during transportation and avoids the drawbacks of the prior art.

It is one object of the present invention to provide a fishing rod holder for holding a plurality of fishing rods during transportation. The fishing rod holder comprises a plate, a plurality of brackets mounted to the plate and a plurality of tubes mounted, at an angle facing upward, to the plate. Each of the plurality of tubes comprises a fishing rod receiving section. The plurality of brackets is mounted to a pickup bed of a vehicle. Each of the plurality of fishing rods is received in the fishing rod receiving section to hold the plurality of fishing rods firmly during transportation.

It is another object of the present invention to provide a fishing rod holder for holding a plurality of fishing rods during transportation. The fishing rod holder comprises a base plate, connectors, mounted at an angle, to the base plate, and a plurality of tubes mounted, at an angle, to the connectors. Each of the plurality of tubes comprises a fishing rod receiving section. The base plate is mounted to a rooftop of a vehicle. Each of the plurality of fishing rods is received in the fishing rod receiving section to hold the plurality of fishing rods firmly during transportation.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 3 illustrates a side view of the fishing rod holder 10 aligned to receive a fishing rod from the plurality of fishing rods 50, in accordance with another embodiment of the present disclosure;

FIG. 4 illustrates a perspective view of the fishing rod holder 10 in which the plurality of fishing rods 50 are placed in a plurality of tubes 25, in accordance with one embodiment of the present disclosure;

FIG. 6 illustrates a side view of a fishing rod holder 100, in accordance with another embodiment of the present disclosure;

FIG. 7 illustrates a perspective view of a fishing rod holder 100, in accordance with another embodiment of the present disclosure.

DETAILED DESCRIPTION OF THE EMBODIMENTS OF THE INVENTION

The following detailed description is intended to provide example implementations to one of ordinary skill in the art, and is not intended to limit the invention to the explicit disclosure, as one or ordinary skill in the art will understand that variations can be substituted that are within the scope of the invention as described.

The present disclosure discloses a fishing rod holder for holding a plurality of fishing rods during transportation. The fishing rod holder comprises a plate, a plurality of brackets mounted to the plate and a plurality of tubes mounted, at an angle facing upward, to the plate. Each of the plurality of tubes comprises a fishing rod receiving section. The plurality of brackets is mounted to a pickup bed of a vehicle. Each of the plurality of fishing rods is received in the fishing rod receiving section to hold the plurality of fishing rods firmly during transportation.

Various features and embodiments of a fishing rod holder for holding a plurality of fishing rods are explained in conjunction with the description of FIGS. 1-8.

Figure 1:
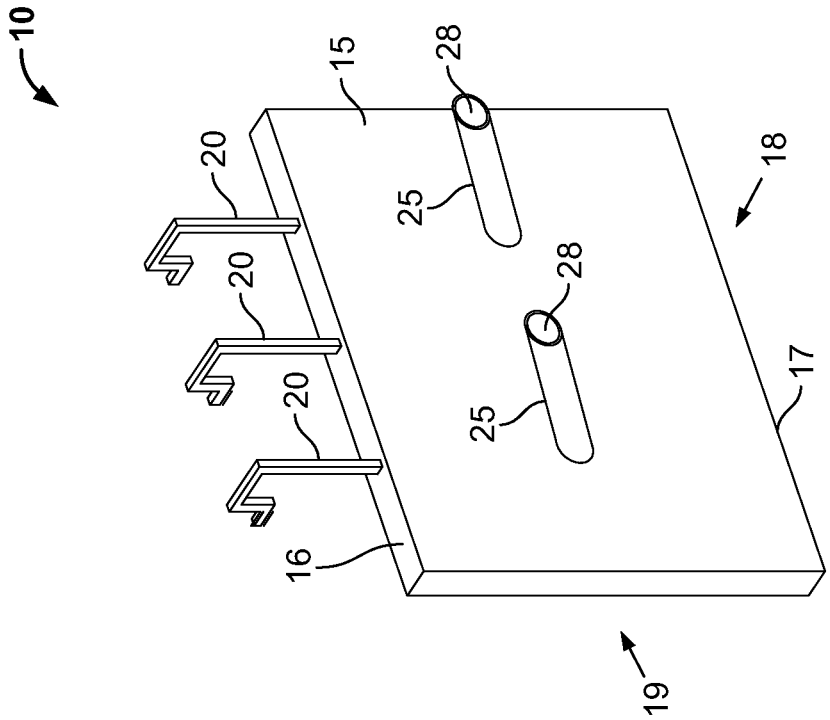
FIG. 1 illustrate an exploded view of the fishing rod holder 10, in accordance with one embodiment of the present disclosure.
Figure 2:
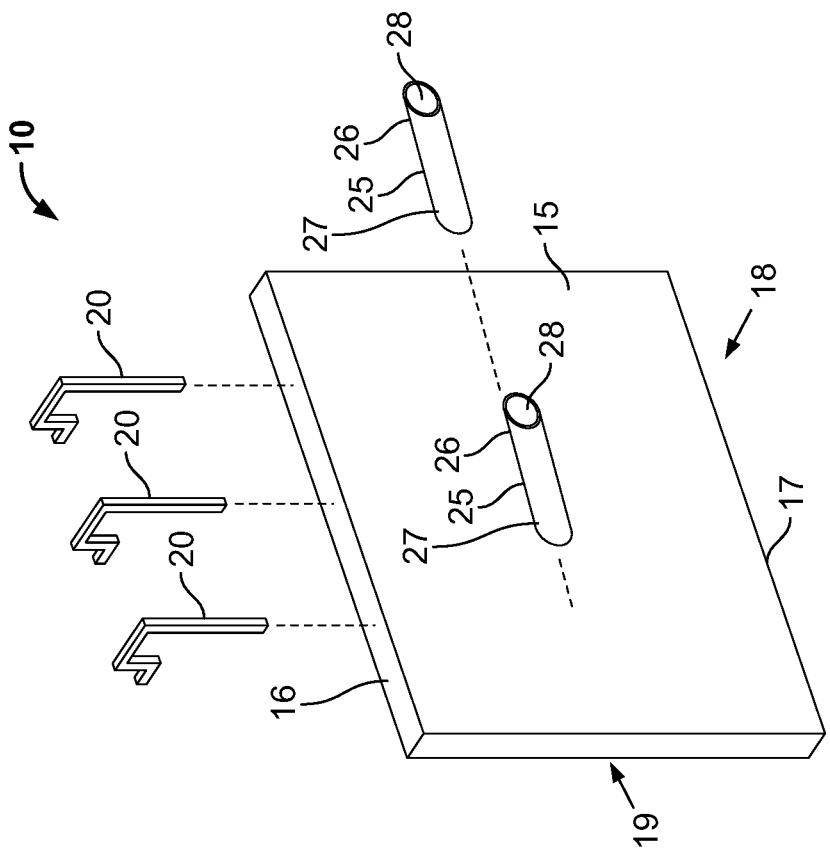
FIG. 2 illustrates a perspective view of the fishing rod holder 10, in accordance with one embodiment of the present disclosure.

Referring to FIGS. 1 and 2, an exploded view and a perspective view of a fishing rod holder 10, respectively, is shown, in accordance with one embodiment of the present disclosure. The fishing rod holder 10 comprises a plate 15. The plate 15 might be made up of metal, hard plastic, wood or any other suitable material. The plate 15 might be provided in square, rectangular, circular, oval, or any other shape.

The plate 15 may comprise a top end 16 and a bottom end 17. Further, the plate 15 may comprise a front end 18 and a rear end 19. At the top end 16, the plate 15 may comprise a plurality of brackets 20 provided in a U-shape or L-shape. Each of the plurality of brackets 20 might be made up of metal, hard plastic, wood or any other suitable material. It should be understood that each of the plurality of brackets 20 is mounted to the plate 15 using known mechanisms such as welding or fasteners.

Further, the fishing rod holder 10 comprises a plurality of tubes 25. Each of the plurality of tubes 25 may be provided in a tubular structure i.e., hollow structure. As can be seen, each of the plurality of tubes 25 comprises a first end 26 and a second end 27. At the first end 26, each of the plurality of tube holders 25 comprises a fishing rod receiving section 28. It should be understood that the fishing rod receiving section 28 might indicate an opening provided at the first end 26. Further, the second end 27 is mounted to the plate 15. Specifically, each of the plurality of tubes 25 is mounted to the plate 15 at the front end 18. It should be understood that each of the plurality of tubes 25 is mounted to the plate 15 using known mechanisms such as welding or fasteners. As can be seen, the plurality of tubes 25 is mounted to the plate 15 at an angle with respect to the plate 15. It should be understood that the plate 15 and the plurality of tubes 25 form the shape of G due to the angle at which the plurality of tubes 25 is mounted to the plate 15.

Now referring to FIG. 3, a side view of the fishing rod holder 10 aligned to receive a plurality of fishing rods 50 is shown, in accordance with one embodiment. As known, each of the plurality of fishing rods 50 comprise a handle 55. Further, each of the plurality of fishing rods 50 comprise a reel 57. Further, each of the plurality of fishing rods 50 comprise a blank 63. The blank 63 comprises a tiptop 65. Further, each of the plurality of fishing rods 50 comprise a plurality of guides 68 to receive a reel.

In order to mount the plurality of fishing rods 50 to the fishing rod holder 10, the handle 55 of the plurality of fishing rods 50 is aligned with the plurality of tubes 25 of the fishing rod holder 10. It should be understood that diameter of the plurality of tubes 25 is more than the diameter of the handle 55 so that the handle 55 can be inserted into the plurality of tubes 25. Referring to FIG. 4, a plurality of fishing rods 50 placed in the plurality of tubes 25 for holding the plurality of fishing rods 50 is shown, in accordance with one embodiment of the present disclosure.

Figure 5:
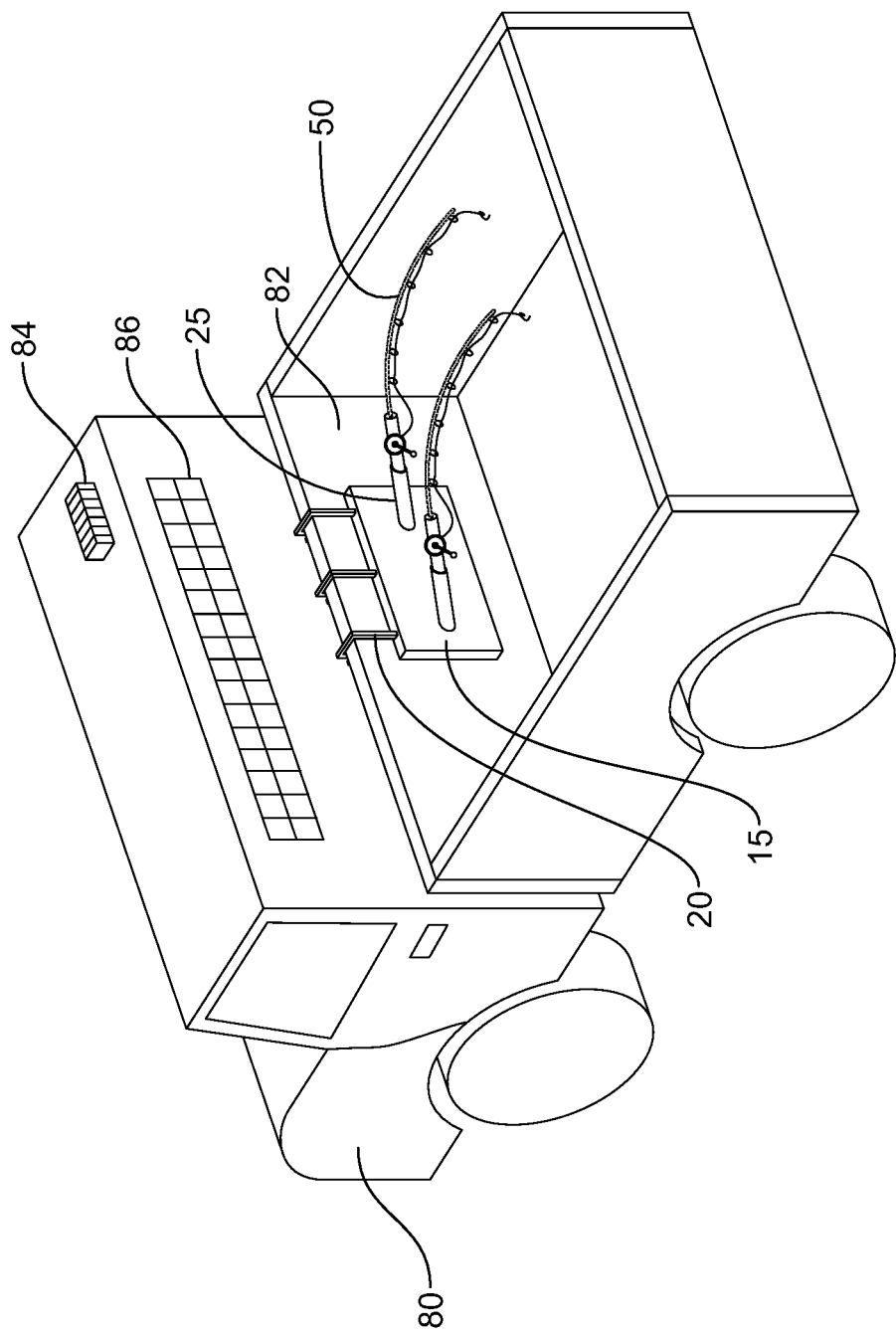
FIG. 5 illustrates a perspective view of the fishing rod holder 10 installed on a vehicle 80 for holding the plurality of fishing rods 50, in accordance with one embodiment of the present disclosure.

Now referring to FIG. 5, the fishing rod holder 10 installed on a vehicle 80 for holding the plurality of fishing rods 50 during transportation is shown, in accordance with one embodiment of the present disclosure. The vehicle 80 may include a pickup truck or any other vehicle. As known, the vehicle 80 may comprise a pickup bed 82, lights 84 on a rooftop, and a back window 86. As can be seen, the fishing rod holder 10 might be installed at the pickup bed 82 of the vehicle 80.

In order to install the fishing rod holder 10 to the pickup bed 82, at first, the plurality of tubes 25 may be mounted to the plate 15 as explained above. Further, the plurality of brackets 20 may be mounted to the plate 15 as explained above. Subsequently, the fishing rod holder 10 may be mounted to the pickup bed 82 in that the plurality of brackets 20 may be mounted to the pickup bed 82. When the plurality of brackets 20 is mounted, the plate 15 is suspended with the help of the plurality of brackets 20.

Consider that a user finished fishing and would like to transport the plurality of fishing rods 50 using the vehicle 80. The user or a fisherman may place the plurality of fishing rods 50 in the plurality of tubes 25 for holding the plurality of fishing rods 50. It should be understood that the plurality of fishing rods 50 are firmly held in place so that the plurality of fishing rods 50 do not fall on the pickup bed 82 and get damaged or scratched. As specified above, the plurality of tubes 25 is mounted to the plate 15 at an angle with respect to the plate 15. As a result, when the plurality of fishing rods 50 is placed in the plurality of tubes 25, the plurality of fishing rods 50 is made to suspend upwardly thereby avoiding contact with the pickup bed 82. Thus, the plurality of fishing rods 50 is transported without getting damaged or scratched.

After reaching a destination, for example, a residence of the user, the user may demount the plurality of fishing rods 50 from the plurality of tubes 25. Subsequently, the user may demount the fishing rod holder 10 from the pickup bed 82 of the vehicle 80 and store the fishing rod holder 10 in a safe place for later use.

Referring to FIGS. 6 and 7, a side view and a perspective of a fishing rod holder 100, respectively is shown, in accordance with another embodiment of the present disclosure. In the current embodiment, the fishing rod holder 100 comprises a base plate 105. The base plate 105 comprises a belt 107. Further, the base plate 105 comprises a plurality of magnetic members 109 provided at a bottom of the base plate 105. Further, the fishing rod holder 100 comprises connectors 115 mounted to the base plate 105. As can be seen in FIG. 6, the connectors 115 are mounted to the base plate 105 at an angle with respect to the base plate 105. It should be understood that the connectors 115 might be mounted to the base plate 105 using known mechanism such as welding or fasteners.

Further, the fishing rod holder 100 comprises a plurality of tubes 120 mounted to the connectors 115. As can be seen, the plurality of tubes 120 is mounted at an angle with respect to the connectors 115. It should be understood that the plurality of tubes 120 is mounted to the connectors 115 using known mechanism such as welding or fasteners. It should be understood that the base plate 105, the connectors 115 and the plurality of tubes 120 form the shape of G due to the angle at which the plurality of tubes 120 is mounted to the connectors 115, and the connectors 115 mounted to the base plate 105.

Each of the plurality of tubes 120 comprises a first end 121 and a second end 122. At the first end 121, each of the plurality of tubes 120 is provided with a fishing rod receiving section 125. The fishing rod receiving section 126 may indicate an opening provided at the first end 121 of each of the plurality of tubes 120. Further, the each of the plurality of tubes 120 comprises a drain hole 127 provided at the second 122. The drain hole 127 may indicate an opening at the second end 122. Further, the fishing rod holder 100 comprises a strap 130 provided at the first end 121. It should be understood that the strap 130 is used to tie a fishing rod to hold the fishing rod firmly during transportation.

Figure 8:
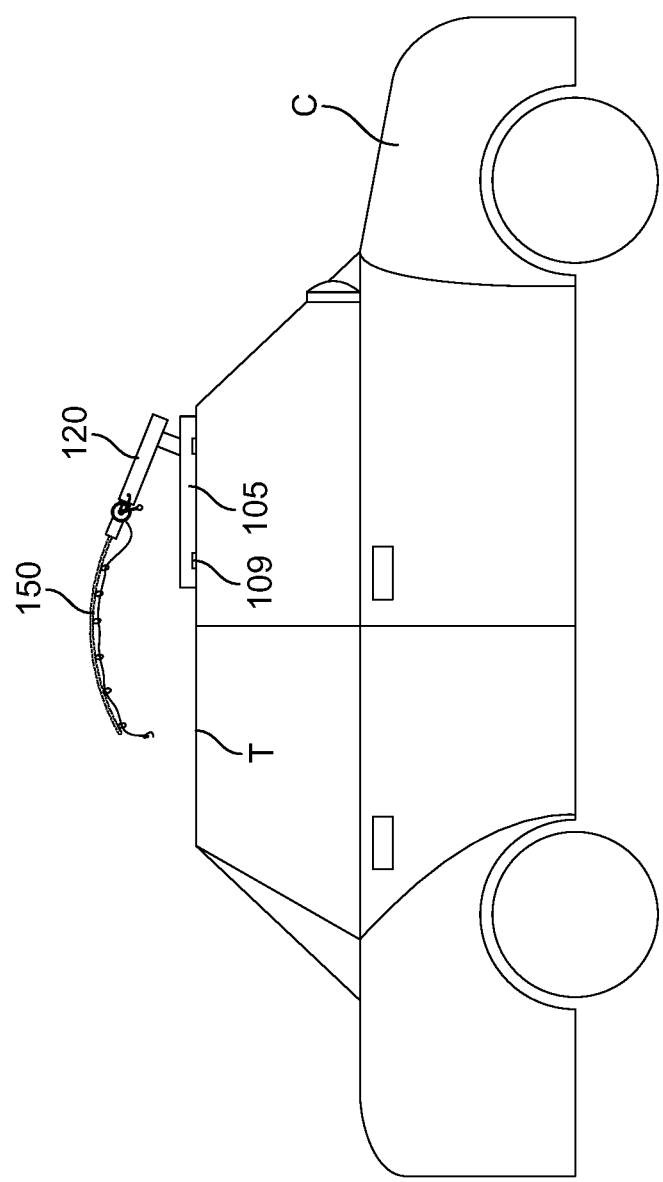
FIG. 8 illustrates a side view of the fishing rod holder 100 installed on a rooftop T of a vehicle C, in accordance with one embodiment of the present disclosure.

Now referring to FIG. 8, the fishing rod holder 100 mounted on a vehicle C is shown, in accordance with one embodiment of the present disclosure. As can be seen, the fishing rod holder 100 is mounted on a rooftop T of the vehicle C. In the above embodiment, the plurality of brackets 20 is used to mount the fishing rod holder 10 to the vehicle 80. In the current embodiment, the plurality of magnetic members 109 provided at the base plate 105 is used to mount the fishing rod holder 100 to the vehicle C.

In order to mount the fishing rod holder 100 to the vehicle C, at first, the fishing rod holder 100 is assembled i.e., the base plate 105 is mounted to the rooftop T of the vehicle C with the help of the plurality of magnetic members 109, the connectors 115 are mounted to the base plate 105, and the plurality of tubes 120 is mounted to the connectors 115 as explained above. As such, when the fishing rod holder 100 is placed on the rooftop T of the vehicle C, the plurality of magnetic members 109 ensures that the fishing rod holder 100 is firmly mounted to the rooftop T of the vehicle C. Subsequently, a plurality of fishing rods 150 may be inserted into the plurality of tubes 120. Further, the strap 180 provided at each of the plurality of tubes 120 may be used to hold the plurality of fishing rods 150.

As specified above, the plurality of tubes 120 is mounted to the connectors 115 at an angle, which in turn is placed at an angle with respect to the base plate 105. As a result, when the plurality of fishing rods 150 is placed in the plurality of tubes 120, the plurality of fishing rods 150 is made to suspend upwardly thereby avoiding contact with the rooftop T of the vehicle C. Thus, the plurality of fishing rods 150 is transported without getting damaged or scratched. In other words, the plurality of fishing rods 150 are firmly held in place so that the plurality of fishing rods 150 do not come in contact with the rooftop T of the vehicle C and get damaged or scratched.

After use, i.e., after transporting the plurality of fishing rods 150 with the help of the fishing rod holder 100 mounted on the vehicle C, the user may demount the plurality of fishing rods 150 from the plurality of tubes 120. Subsequently, the user may demount the fishing rod holder 100 from the rooftop T of the vehicle C and store the fishing rod holder 100 at a safe place for later use.

Based on the above, it is evident that the fishing rod holder is very easy to install or uninstall onto the vehicle. Further, the fishing rod holder facilitates in easy mounting of the fishing rods into the tubes provided at the fishing rod holder. As such, the user need not worry about spending extensive time in mounting and unmounting the fishing rods into the tubes provided at the fishing rod holder. Also, the user need not to spend much time to mount or unmount the fishing rod holder for transporting the fishing rods without getting them damaged or scratched. Further, the fishing rod holder is easy to mount or unmounts be it at the pickup bed or on rooftop, as such; the user can quickly remove the fishing rod holder in case he wishes to use the vehicle for other purposes.

Further, the fishing rod holder is mounted at the pickup bed or at the rooftop of the vehicle, as a result, it is easy for the user to place or take out the fishing rods from the tubes provided at the fishing rod holder.

With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A fishing rod holder, said fishing rod holder comprising:
a plate;
a plurality of brackets mounted to said plate, said plurality of brackets being entirely above of said plate; and
a plurality of tubes mounted, at an angle facing upward, to said plate, each of said plurality of tubes having a distal end secured to said plate, said plate being entirely behind each of said plurality of tubes, said plate and said plurality of tubes being in constant abutting contact with each other, wherein each of said plurality of tubes includes a receiving section, wherein said plurality of brackets are removably mounted to a pickup bed of a vehicle, a plurality of fishing rods wherein each of said plurality of fishing rods are received within said receiving section to hold said plurality of fishing rods firmly during transportation.

2. The rod holder of claim 1, wherein said plurality of brackets is provided in a U-shape or a L-shape structure.

3. The fishing rod holder of claim 1, wherein said plurality of brackets extend vertically.

4. The fishing rod holder of claim 1, wherein each of said plurality of brackets includes a shaft and a head, said shaft extending vertically, said head extending perpendicularly to said shaft, said head extending below a partial height of said shaft.

5. The fishing rod holder of claim 1, wherein said plurality of tubes are on a same horizontal plane and parallel to each other.

6. The fishing rod holder of claim 1, wherein said plate extends a partial length of said pickup bed, said plurality of brackets being substantially in abutting contact with sidewalls of said pickup bed when said plurality of brackets are mounted to said vehicle.

7. A fishing rod holder, said fishing rod holder comprising:
a base plate;
connectors mounted vertically at an angle to said base plate, said connectors being on a same plane and parallel to each other; and
a plurality of tubes mounted at an angle to said connectors, said plurality of tubes being on a same horizontal plane and parallel to each other, said plurality of tubes being entirely above of said plate, wherein each of said plurality of tubes includes a receiving section, wherein said base plate is mounted to a rooftop of a vehicle, wherein a plurality of fishing rods are received within said receiving section to hold said plurality of fishing rods firmly during transportation.

8. The fishing rod holder of claim 7, wherein said base plate includes a plurality of magnetic members to firmly mount said base plate to said rooftop of said vehicle.

9. The fishing rod holder of claim 8, wherein said magnetic members are at an underside of said base plate, said magnetic members being parallel to each other, said magnetic members being recessed within said base plate.

10. The fishing rod holder of claim 7, wherein each of said plurality of tubes a strap used to firmly hold each of said fishing rods in said fishing rod receiving section.

11. The fishing rod holder of claim 10, wherein said straps are secured to an opening on each of said plurality of tubes.

* * * * *